(12) United States Patent
Treder et al.

(10) Patent No.: US 7,392,510 B1
(45) Date of Patent: Jun. 24, 2008

(54) SYSTEM FOR TRACKING AND PROVIDING ACCESS TO INFORMATION ABOUT SERVER COMPONENTS INVOKED DURING THE DYNAMIC GENERATION OF WEB PAGES

(75) Inventors: Douglas M. Treder, Seattle, WA (US); Lawrence G. Tesler, Seattle, WA (US); Paul G. Nordstrom, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 939 days.

(21) Appl. No.: 10/913,295

(22) Filed: Aug. 6, 2004

(51) Int. Cl.
*G06F 9/45* (2006.01)
(52) U.S. Cl. .................................. 717/128; 709/224
(58) Field of Classification Search ................. 717/128; 709/224
See application file for complete search history.

(56) References Cited

U.S. PATENT DOCUMENTS

| | | | |
|---|---|---|---|
| 6,006,260 A | 12/1999 | Barrick, Jr. et al. | |
| 6,587,969 B1 | 7/2003 | Weinberg et al. | |
| 6,862,620 B2 * | 3/2005 | Ullmann et al. | 709/224 |
| 7,010,467 B2 * | 3/2006 | James | 702/188 |

OTHER PUBLICATIONS

Chapters 1-3 (pp. 1-108) of manual titled "Macromedia Dreamweaver 3—Using Dreamweaver," dated Dec. 1999.
Article titled "*Tracing*" by Rob Howard of Microsoft Corporation, dated Jan. 25, 2001, printed from Microsoft ASP.NET Developer Center web site (10 printed pages).

* cited by examiner

*Primary Examiner*—John Chavis
(74) *Attorney, Agent, or Firm*—Knobbe, Martens, Olson, & Bear LLP

(57) ABSTRACT

A web server system selectively supplements dynamically-generated web pages with coding that allows developers and other authorized users to identify, and access remotely-stored information about, the executable server components used to generate such web pages. In one embodiment, the web server system includes a trace utility that monitors the dynamic generation of a requested web page. The trace utility outputs a mapping structure that maps components of the web page to corresponding server components that were invoked. The mapping structure is embedded within the web page along with code that is executable by an ordinary web browser to allow a user to interactively view associations between the page components and the executed server components. The system also provides restricted access to development and maintenance documents and functionality associated with the executable components.

34 Claims, 12 Drawing Sheets

SYSTEM FOR TRACKING AND PROVIDING ACCESS TO INFORMATION ABOUT SERVER COMPONENTS INVOKED DURING THE DYNAMIC GENERATION OF WEB PAGES

APPENDIX AND COPYRIGHT MATERIALS

This specification includes, as an appendix, a JavaScript code listing that is subject to copyright protection. The copyright owner has no objection to the facsimile reproduction of the code listing as it appears in the files or records of the U.S. Patent and Trademark Office, but otherwise reserves all rights whatsoever.

BACKGROUND OF THE INVENTION

1. Field of the Invention

The present invention relates to tools for assisting software and web developers and other computer users in developing, analyzing, and/or maintaining executable components used to dynamically generate web pages and other types of electronic documents.

2. Description of the Related Art

Web sites and other types of electronic document systems commonly generate documents dynamically in response to requests from user computing devices. In complex systems, a given document may be generated from content obtained from a number of different sources. For example, in some web sites, a given web page may include multiple visual components, each of which includes content generated or obtained from a different server-side component or set of components (web services, applications, functions, etc.). The set or sequence of server-side components invoked to generate a particular web page may vary from one instance of the web page to the next. This may be the case where, for example, the structure of the web page is dependent upon attributes of the user, attributes of the browsing session, and/or other variables.

In systems of the type described above, the task of developing and maintaining web pages, and the associated server-side components, can be complex and time consuming. This difficulty can be compounded by the effort necessary to identify which executable server-side component generated a particular web page element. For example, when a developer becomes aware of an error in a particular visual or other component of a web page, the developer may spend a significant amount of time trying to identify the particular executable component(s), and/or the particular sequence of events, that caused or contributed to the error.

As another example, when a graphic designer who has assumed responsibility for an existing web site wishes to understand the reason that a predecessor made a specific design decision, he or she must typically search through paper or electronic storage systems to find relevant design documents. Without knowing where the documents are or what they are called, the designer may spend a significant amount of time trying to find them. As a final example, when a visitor to a web site wishes to report a usability issue or a software bug related to a component of a web page, unless he knows the technical term that the developers use to describe the page component, his communication of the problem to the webmaster could easily be misunderstood.

SUMMARY OF THE INVENTION

In accordance with one embodiment of the invention, a web server system that generates web pages dynamically is provided with a tracing utility that traces the dynamic generation of web pages. The tracing utility operates by recording the sequence or hierarchy of calls that are made to specific executable, server-side components as a web page is dynamically generated. At the end of the page generation process, the tracing utility outputs a mapping structure that maps the visual components or sections of the web page (and possibly non-visual page components) to the corresponding executable components that were invoked. The mapping structure is then incorporated into the non-visible coding of the web page together with a script that is executable by a web browser that supports an associated scripting language.

The embedded script and mapping structure provide functionality for a user to interactively view, via an ordinary web browser, the associations between the page components and the executable server components. For example, in one embodiment, when a user selects a particular page component, such as by using a mouse or other pointing device, the embedded script causes the web browser to display information about, and/or a menu for accessing information about, a server component that was executed to generate the selected page component. The information and/or menu may be presented in various forms, such as a pop-up window or a drop-down menu. To assist the user in interactively identifying the associations, the embedded script may additionally cause the web browser to highlight the currently selected page component on the screen, such as by displaying a border around, or varying the appearance of, the selected page component.

In one embodiment, the web server system embeds the mapping structure and associated functionality within web pages only when such pages are retrieved by authorized users. For example, a web page may be augmented with such functionality only when it is requested by a user that is internal to a firewall associated with the web site, and/or only when the requesting user has an appropriate level of access rights (e.g., "developer" or "page owner"). Further, a personal configuration page may be provided through which each authorized user can specify whether the pages that user retrieves are to be augmented.

Various types of information about the executable server components may be made accessible to users via this feature. For example, authorized users may be provided with access to functional specifications, usability test results, test and launch schedules, performance data, usage statistics, invocation-specific data, source code files, bug reports, help information, and/or any other type of information about the executable server component. The types of information that are made available may vary widely depending upon the purpose for which the feature is employed within a given system. In addition, different users within a given organization may have access to different types of information. For instance, software developers within a given organization may be given access to the source code files associated with the server components (optionally including the ability to edit such files using a web browser), while other members of the organization may only be permitted to view other types of information.

In one embodiment that is particularly well suited for use by software developers, selection of a visual page component causes the web browser to visually indicate, within a trace tree, the particular executable component invocation(s) that occurred to generate the selected visual component. The trace tree also depicts a hierarchy of all of the component invocations that occurred to generate the ordinary content of the web page. The trace tree may, for example, be displayed in a separate browser window, such as a pop-up window, so that the user can continue to view the underlying web page, or may be displayed in a layer that appears to float above the web page. Selection of a node within the visual representation of the trace tree causes the corresponding visual component of the web page to be highlighted, and selection of a particular visual component of the web page causes the corresponding node of the trace tree to be highlighted. The user can thus readily identify the associations between visual page components and the executable component invocations that generated them. In addition, by viewing the trace tree, the user can efficiently identify the sequence of events (service calls, etc.) that occurred during generation of the particular instance of the web page being viewed. While viewing the trace tree in this embodiment, the user can also select a particular node/component invocation to access development-related information (source code files, specifications, bug reports, etc.), and/or other information, about the executable component.

The invention thus comprises a method for facilitating the analysis of a dynamic web page generation process. The method comprises monitoring the dynamic generation of a web page by a server system to identify executable components invoked on the server system to generate the web page; and generating a mapping structure that maps page components of the web page to the corresponding executable components used to generate such page components. The method additionally comprises incorporating into coding of the web page a representation of the mapping structure, together with code that is executable by a web browser (typically executing on a client system distinct from the server system) to provide a visual indication of associations between the page components and the executable components as represented within the mapping structure.

The invention is also applicable to other types and formats of documents that are generated dynamically.

Neither this summary nor the following detailed description purports to define the invention. The invention is defined by the claims.

DETAILED DESCRIPTION OF ILLUSTRATIVE EMBODIMENTS

For illustrative purposes only, the invention will be described largely in the context of a system that dynamically generates web pages. As will be apparent, however, the invention is applicable to server systems that dynamically generate other types and formats of electronic documents. By way of illustration and not limitation, the invention is applicable to documents encoded using HyperText Markup Language (HTML) coding, Extensible Markup Language (XML) coding, Standard Generalized Markup Language (SGML) coding, or any combination(s) thereof. In addition, the invention can be applied to Adobe Acrobat and Portable Document Format (PDF) documents, Microsoft Word documents, Excel documents, PowerPoint documents, and documents in formats that may be developed in the future. It will be appreciated that the examples described herein may be extended or modified to accommodate other electronic document formats and content types. As such, the scope of the invention is not limited to the specific examples described herein, but rather is defined by the claims.

Figure 1:
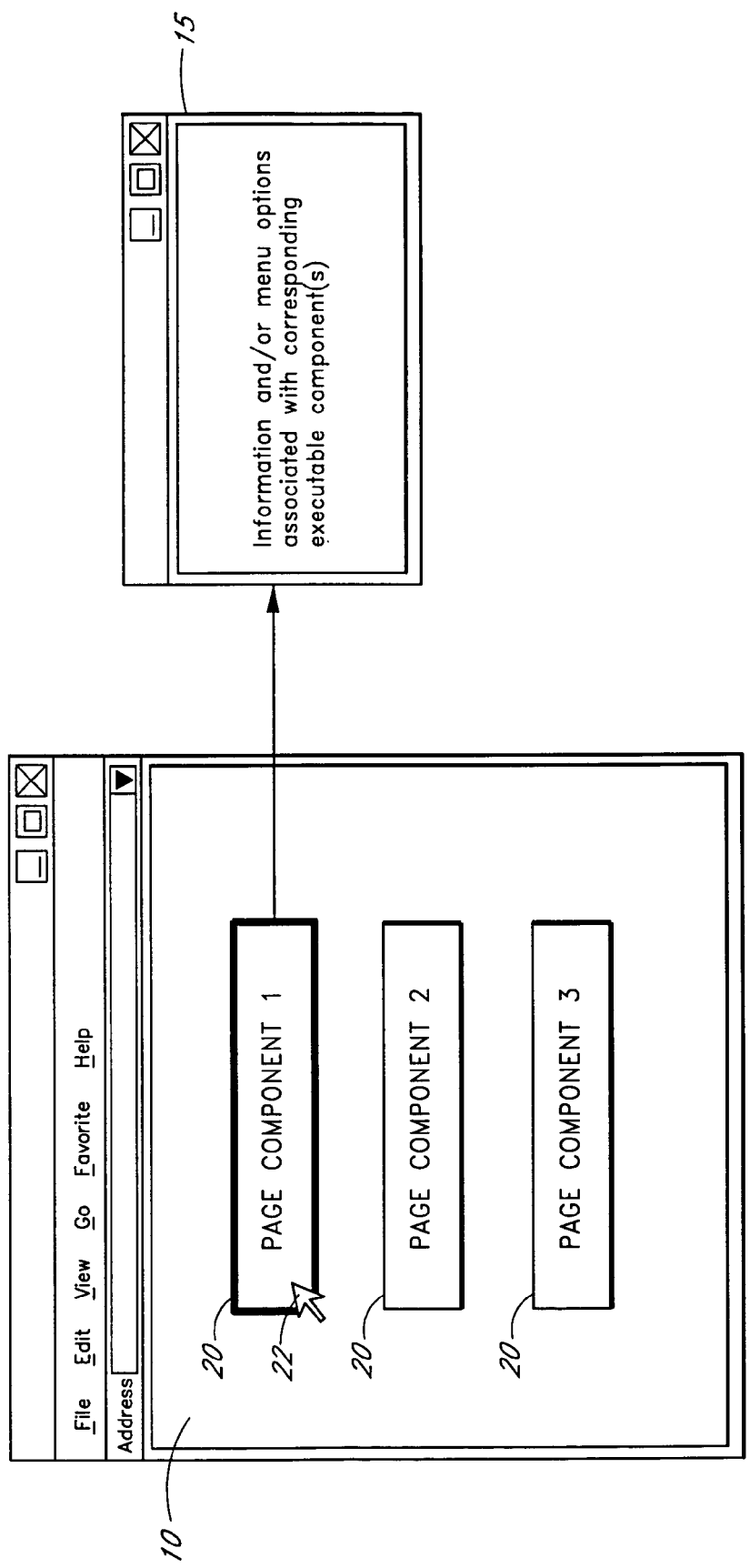
FIG. 1 illustrates the layout of an example web page, and illustrates an associated inspector that may be invoked during viewing of the web page.

FIG. 1 illustrates the general layout of a dynamically-generated web page 10, and illustrates an inspector 15 that displays information about one or more executable components used to dynamically generate the page 10. The inspector 15 is generated by an ordinary web browser that supports a client-side scripting language such as JavaScript, VBScript, or ActiveX. The browser generates the inspector 15 by executing a script embedded in the web page 10 in accordance with the invention. The inspector 15 may include a number of different views for displaying various types of information. As described below, the script may be selectively embedded within web pages by the associated web server system when such pages are retrieved by authorized users, such as developers and administrators of the associated web site.

The web page 10 comprises visible content, and is encoded in a structured language such as HTML. As is common, the web page 10 includes multiple distinct sections or portions 20 (three shown). Each such section or portion is referred to herein as a "page component." Each page component 20 may, for example, be in the form of content generated or supplied by a particular executable, server-side component. (As used herein, the terms "page component" and "visual component" refer generally to a portion of a web page or other dynamically-generated electronic document, and the terms "server component" and "executable component" refer generally to associated code sections or modules executed by a server system to dynamically generate such documents.) For instance, in the context of a web page having shopping cart functionality, one page component 20 may display the user's shopping cart contents as maintained by a shopping cart service, while another page component 20 may display personalized recommendations generated by a recommendations service. Other types of page components 20 that may be incorporated into a web page include, for example, tabs for navigating to other areas of the web site, a search box for entering a search query, and a listing of browse tree categories for navigating an electronic catalog of items. Two or more different display elements (search fields, buttons, links, text, etc.) that are displayed in the same general area on the page or are otherwise related may be grouped together to form a single page component 20. The groupings of display elements into page components 20 may be specified by a developer, or may be determined based on associations specified within an associated development environment.

The types of page components 20 included with the pages of a given web site will depend upon the nature and purpose of the web site. Typically, a given page component 20 will consist of content supplied by a corresponding server component. In some cases, however, a given page component 20 may include content generated or supplied by multiple server components. For example, where a given page component 20 includes personalized content that is based on the user's browse history, the page component 20 may be generated by the web server system by initially calling one service to retrieve information from the user's browse history, and then calling another service that generates the personalized content based on this browse history. Some types of page components 20 may be hidden, meaning that they do not appear within the visual content of the web page.

The layout of the web page 10 is defined generally by the placement of the page components 20 with respect to one another. In some systems, the layout of a given page, and/or the content of the visual components 20 on the page, may vary from one instance of the page to the next. For example, the web server system may generate a given web page differently based on the profile of the particular user, the state of the user's browsing session, and/or other variables. As mentioned above, this characteristic of many dynamic web page generation systems complicates the task of identifying the server components used to dynamically generate the web pages.

To address this problem in the illustrated embodiment, the script embedded within the web page 10 allows the user to select a particular page component 20 to cause the page component 20 to be highlighted on the page, and to cause information about one or more corresponding executable components to be displayed by an inspector 15. In the illustrated embodiment, the user selects a desired page component 20 with a mouse or other pointing device for which a pointer 22 is displayed on the screen of the client system. In other embodiments, the user may select a page component 20 using a keyboard, a stylus, a voice command, or another selection method. Prior to selecting the page component 20, the user may be required to enable the display of the inspector 15 by such means as holding down a certain key or mouse button, choosing a particular menu item, or adding a special parameter such as "trace=true" to the page URL. The inspector 15 is in the form of a pop-up window in the illustrated embodiment, although other display methods may be used.

In the particular example shown in FIG. 1, the embedded script causes the web browser to surround the currently-selected page component 20 with a box or border. If the selected page component 20 includes multiple visual elements, this border allows the user to visually identify the group of elements included in the page component. While viewing the web page 10, the user can move the pointer 22 to different areas of the page to select different page components 20, causing different inspector views to be displayed. Although a border is used in this example to highlight the selected page component, other forms of highlighting can be used, such as inversion, shading, color variation, and/or size variation. If the web page includes a page component 20 that is ordinarily hidden, an icon, button or other special graphical element may be added to the page's visual content to allow the hidden page component to be selected.

The inspector 15 displays information about the executable server component or components that were used to generate the selected page component 20, and/or displays menu options for accessing such information. The types of information that are made available via the inspector 15 can be varied or customized to achieve a variety of objectives. For example, users may be provided with access to functional specifications, usability test results, performance data, usage statistics, development schedules, component-invocation specific data, source code files, bug reports, help information, and/or any other type of information about the executable server components. The types of information that are made available may vary widely depending upon the purpose for which the inspector is employed within a given system. In addition, different users within a given organization may have access to different types of information. For instance, software developers within a given organization may have access to the source code files associated with the server components (optionally including the ability to edit such files), while other members of the organization may only be permitted to access other types of information.

Figure 4A:
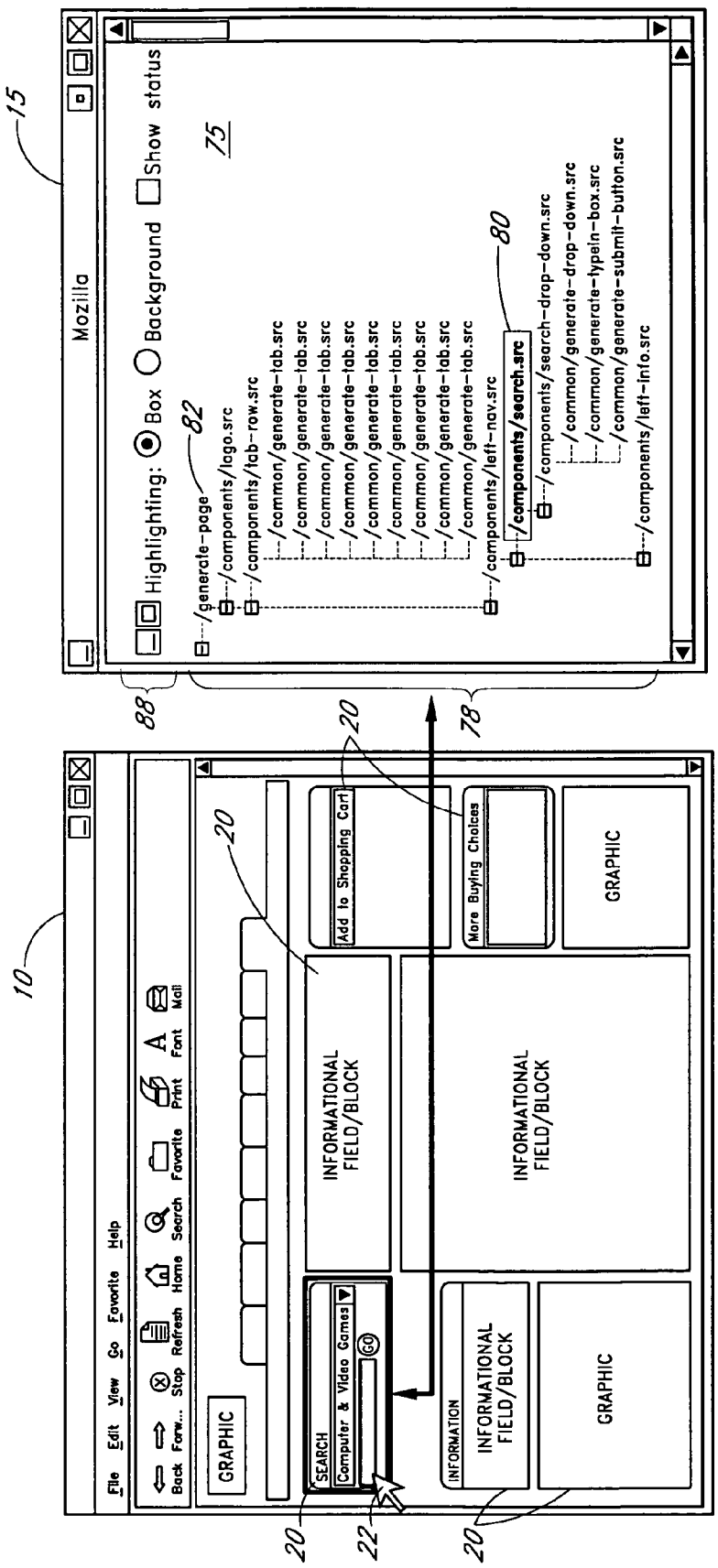
FIG. 4A illustrates the layout of an example web page that may be generated in the embodiment of FIG. 2, and illustrates an associated inspector view that displays a trace tree.

In one embodiment that is particularly well suited for software development and debugging applications, the inspector 15 also displays a hierarchy or "trace tree" of all of the calls that were made to executable components during generation of the web page 10 (see FIG. 4A). As described below, while viewing this trace tree, the user can select a particular executable component invocation within the trace tree to cause a corresponding server-component-specific menu to be displayed in a separate inspector pop-up window. From this menu, the user may access general information about the selected server component, such as development specifications, source code, design notes, and bug reports. From this same menu, the user may also access and/or edit specific information about the selected invocation of the component, such as the execution sequence number of a repeatedly executed component, and performance data such as the time the server spent generating the page component. The user may additionally be able to perform other types of development and maintenance activities related to the accessed components and their invocations.

Although pop-up windows are used in the illustrated embodiments, other display methods may be used. For example, the information about the server components may alternatively be displayed in a separate, ordinary browser window, or may be embedded within the visible content of the web page 10 itself (e.g., at the bottom of the page or in a layer that appears to "float" above the page). In addition, some information about how the page 10 was generated may be incorporated into the visible content of the page, while other information may be presented in a separate window.

The above-described inspector functionality may be configured as a selectively invoked feature that is inoperative by default until proper authentication or user credentials are recognized. For example, the JavaScript or other coding used to generate the inspector 15 may be embedded within a requested web page only if the request (a) is accompanied by a particular cookie, (b) is generated from inside a firewall associated with the web site, and/or (c) is generated by a computer at an authorized Internet Protocol (IP) address. The types of actions that can be performed by the user via the inspector 15 may also depend on the user's access rights. For example, only certain users may be given the right to edit the code of a given server component.

Developers and other authorized users are thus provided with a highly efficient mechanism for identifying the linkage between specific page components 20 and server components, and for accessing information about the invoked server components. This functionality is advantageously provided without requiring the authorized users to install any software on their respective computers other than an ordinary web browser. Thus, for example, a user may access web pages, and perform associated development and maintenance tasks (or tasks associated with some other job responsibility), from any computer that runs a web browser. These aspects of the illustrated embodiments represent a significant improvement over conventional methods. Although an ordinary web browser is sufficient in the illustrated embodiments, in other embodiments a special browser plug-in may be required for accessing some or all of the embedded functionality.

Figure 2:
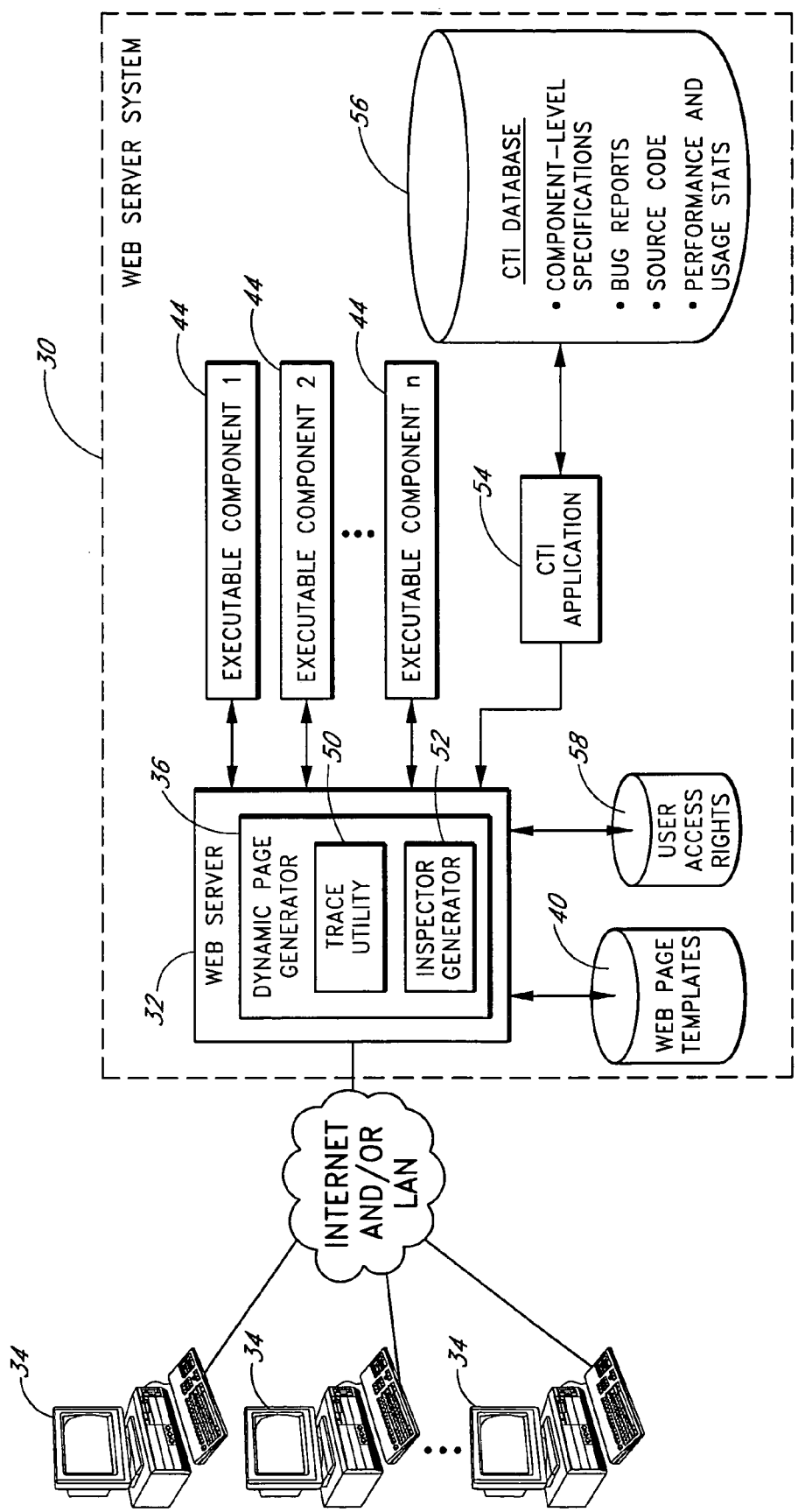
FIG. 2 is a block diagram of an example web site system that provides component tracing and inspection functionality according to one embodiment of the invention.

FIG. 2 is a block diagram of a web server system 30 for dynamically generating web pages of a web site, and for providing associated functionality as described above. The server system 30 includes a web server 32, and may include one or more additional servers (application servers, database servers, etc.) that communicate with the web server 32. Each server may be implemented using one or more general purpose computers configured with server software. The server system 30 may include computers that are geographically distributed and/or are operated by multiple different entities. For instance, to process a page request, the web server 32 may, in some cases, retrieve information from a remote server operated by a business partner, and may incorporate this information into the requested web page.

The web server 32 includes a dynamic page generator 36 that generates the some or all of the web pages of the web site in response to requests from user computing devices 34 that run web browser software. The user computing devices 34 may includes Personal Computers (PCs), Personal Digital Assistants (PDAs), cellular telephones, televisions, and other types of computing devices that include web browsing capabilities. In one embodiment, the server system 30 hosts a publicly-accessible web site that provides functionality for users to make purchases from an electronic catalog of items, and to create listings for selling items to other users.

The dynamic page generator 36 generates the web pages according to web page templates stored in a database 40, as is known in the art. For example, an item detail page template may be used to generate item detail pages for each of the catalog items represented in a database. Similarly, a browse node template may be used to generate pages that correspond to specific nodes of a hierarchical browse structure in which the catalog items are arranged by category. Many different templates may, of course, be provided within a given system 30. Although templates are used in the illustrated embodiment, the invention does not require the use of templates.

In one embodiment, each template is in the form of one or more modules of executable code that identify one or more specific executable modules or components 44 that are to be called or invoked to generate a corresponding web page. When a page request is received by the web server 32, the dynamic page generator 36 retrieves and processes the corresponding template, which may be uniquely identified by the target URL (Uniform Resource Locator) included within the page request. As the template is processed, calls are made to one or more executable server components 44. During execution, a given executable component 44 may invoke one or more other executable components 44. In addition, a given executable component may be invoked multiple times during the dynamic generation of a web page.

The executable components 44 may, for example, include web services and applications that are used to look up or generate the visible and non-visible content of the requested page. The executable components 44 typically run on physical servers that are separate from the physical web server(s), but may alternatively run on the web server machines. Some service calls may be dependent upon the results of other service calls, and/or may depend on the state of the browsing session, the identity of the user, or other parameters. Examples of specific architectures that may be used to generate the web pages in the system of FIG. 2 are described in the following co-pending U.S. patent applications, the disclosures of which are hereby incorporated by reference herein: U.S. application Ser. No. 10/260,215, filed Sep. 27, 2002, and U.S. application Ser. No. 10/612,529, filed Jul. 2, 2003.

To provide the above-described functionality for accessing information about executable components 44, the server system 30 is also provided with the following elements: a trace utility program 50, an inspector generator program 52, a Component Tracing and Inspection (CTI) application 54, a CTI database or other repository 56 of server-component-level content, and a database 58 of user access rights. These elements 50-58 will be referred to collectively as the CTI system. The trace utility 50 is responsible for tracing the dynamic generation of a web page, and for generating a mapping that associates the generated page components 20 with corresponding executable components 44 used to generate such page components. The trace utility 50 may also generate a trace tree that represents the hierarchy or sequence of executable components 44 invoked during generation of the page. The inspector generator 52 is responsible for embedding within the web page JavaScript or other executable code for generating the inspector 15.

The CTI application 54 is responsible for providing access to a CTI repository 56 of server-component-level content in accordance with access rights information stored in the access rights database 58. The server-component-level content stored in the CTI repository 56 for a given executable component 44 may include, for example, functional specifications, technical specifications, bug reports, source code files, usability studies, performance and usage statistics, help information, test and launch schedules, and/or any other type of information that may be helpful to users. Different levels of access rights may be provided to different classes of authorized users. For example, users with "developer" credentials may be able to edit specifications and source code files, while users with "page administrator" credentials may only be able to view such specifications and files. Users outside of the organization responsible for the web site may, for example, be able to access help information and personal usage statistics associated with specific executable components 44. The access rights of a given user may also vary from one executable component 44 to another in accordance with the job responsibilities of the users.

Figure 3A:
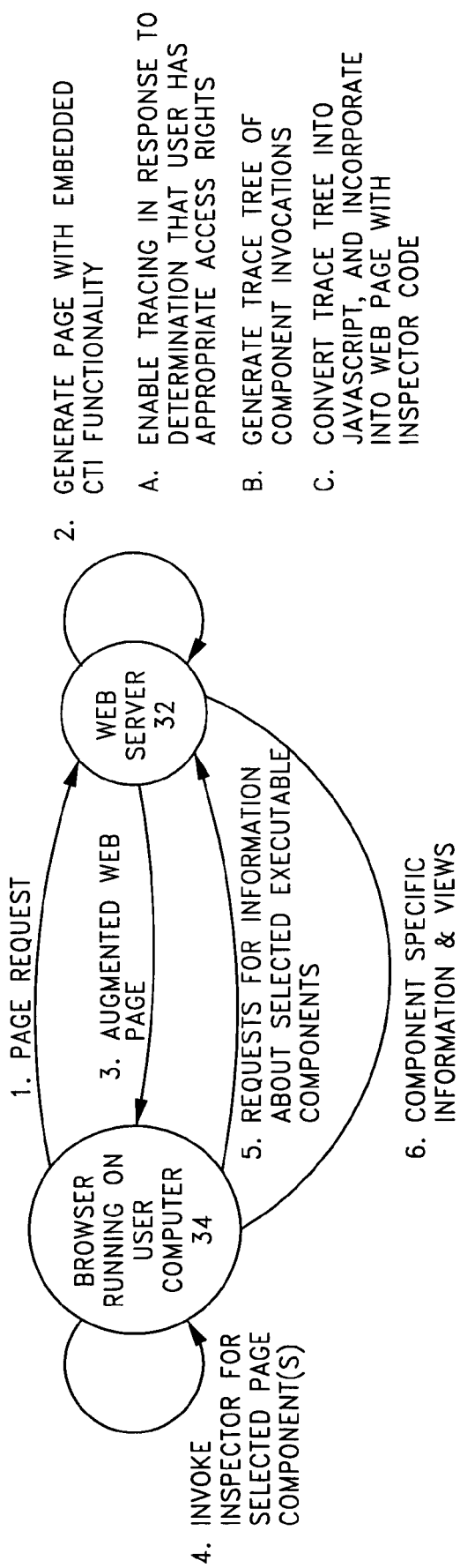
FIG. 3A illustrates an example sequence of events that occur in the system of FIG. 2 when an authorized user requests a web page and then invokes the inspector.

FIG. 3A illustrates one example of a sequence of events that may occur in the system of FIG. 2 when an authorized user requests a web page via a browser running on user computer 34. It is assumed in this example that the user has the appropriate credentials to access the CTI functionality of the system, and that the functionality of the CTI system is enabled for this user. In addition, it is assumed in this example that a trace tree is initially presented when the user selects a page component 20 with the pointer 22; as discussed above, the display of the trace tree may alternatively be omitted.

In event 1, the web browser 34 sends a page request to the web server 32. In event 2, the web server 32 responds to the page request by dynamically generating the requested page; during this process, the web server 32 performs three primary steps 2A-2C to add CTI functionality to the requested page. When the same web page is requested by an unauthorized user (e.g., an ordinary user or customer of the web site), the CTI functionality is not embedded in the document, or is embedded without providing access to internal or confidential information. Steps 2A-2C may be performed for all web pages of the web site, or for a selected subset of the web pages (e.g., those that are generated dynamically).

In step 2A, the web server 32 enables tracing in response to a determination that the user has appropriate access rights. In step 2B, which is performed as the web page 10 is dynamically generated, the web server's 32 trace utility 50 builds a trace tree that identifies all of the executable components 44 invoked during generation of the page, and which links these component invocations to corresponding page components 20 on the page 10. The tracing process is passive in one embodiment, meaning that it does not change the sequence of components invoked to generate the ordinary content of the web page 10. The trace tree may also contain information about the executable template components or modules invoked, and may include a record of parameters passed between the various executable components 44.

In alternative embodiments, such as those in which the structure of each web page 10 is generally static, the step of building the trace tree may be omitted. In such embodiments, a predefined trace tree that corresponds to the requested web page or template may be used. Further, in embodiments in which the page structures are dynamic but in which a trace tree is not displayed to the user, information about the order or hierarchy in which the executable components 44 are invoked need not be preserved during the tracing process.

In step 2C, the trace tree is converted to a JavaScript representation, and is incorporated into the web page's coding together with associated inspector code 79 for generating the inspector 15. As mentioned above, the trace tree could alternatively be cached on the web server 32 in a form that allows the user to subsequently access information stored in the trace tree. The trace tree may be deleted from the memory of the server system 30 once it has been incorporated into the web page. In embodiments in which the trace tree is not displayed to the user, the trace tree may be replaced with a mapping structure that associates the page's components 20 with corresponding executable components 44 (and possibly specific invocations thereof), but which does not necessarily contain information about the hierarchy of calls made to invoke these executable components 44.

The embedded inspector code 79, which may be a script that is executed by the web browser 34, embodies functionality for providing all of the inspector views and functions described herein. The inspector code 79 may also include instructions for invoking or enabling the inspector 15 in response to particular input actions. In addition, the inspector code 79 provides functionality for highlighting the selected page components.

In event 3, which may overlap with event 2, the web page 10 is returned to the user's computer 34 and is displayed by the web browser 34. The web page 10 may be identical in appearance to a web page generated without embedded CTI functionality. In event 4, the user invokes the inspector for a selected page component 20 on the web page, such as by holding down the right button on the mouse and then clicking on the page component 20. An inspector view or menu which identifies the executable component or components 44 associated with the selected page component 20 may then be generated and displayed by the web browser (see FIGS. 4A-4C, discussed below). The web browser 34 may generate this initial inspector view based solely on the coding embedded within the web page 10, without communicating with the web server 32.

As depicted by event 5, subsequent user actions performed within the inspector view or views, such as a request to view an associated development specification, may result in further communications with the web server 32. As such additional requests are made, the web server 32 may use a browser cookie or other credentials to identify the particular CTI features to be exposed to the user. As depicted by event 6, the executable-component-specific or invocation-specific information and views requested by the user are generated and returned to the user computer for display by the inspector 15. Examples of the types of inspector views that may be generated and displayed are shown in FIGS. 4A-4C, 5A-5E, 6 and 7, which are discussed below.

Figure 3B:
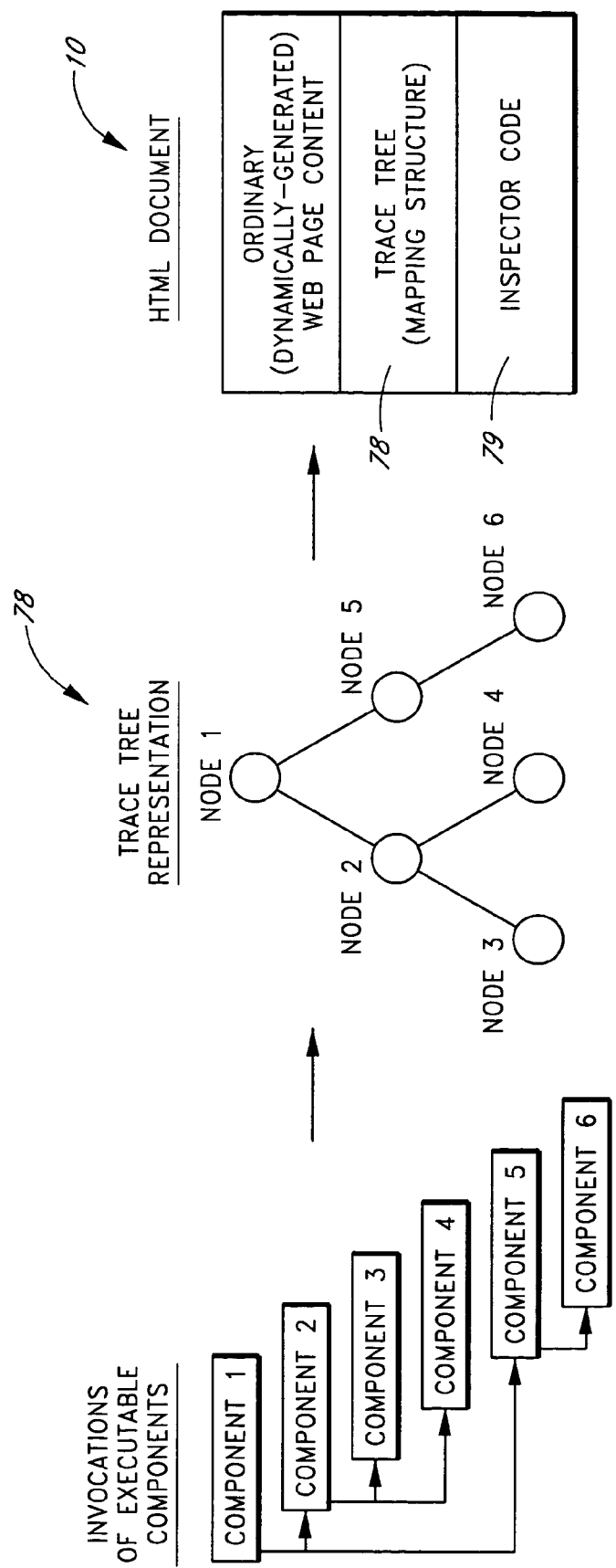
FIG. 3B illustrates, in further detail, how a web page is generated in event 2 of FIG. 3A.

FIG. 3B schematically illustrates the page generation task (event 2 in FIG. 3A) in further detail. During page generation, a top-most executable component 44, which is labeled "component 1," may call one or more other executable components 44 (components 2 and 5 in this example). These executable components 44 may in turn call other executable components as shown in the drawing. The trace utility 50 records the order in which the various executable components 44 are called, and the identities of these executable components, in a nodal trace tree structure 78 in which each component invocation is represented by a respective node. The trace utility 50 also associates specific nodes of the trace tree 78 with corresponding display elements and sections of the web page 10. These associations may be recorded in the trace tree 78 or in a separate table embedded within the web page. Each element of the web page 10 may be tagged to indicate the node/component invocation it corresponds to, such as by using standard HTML naming or a parameter to a JavaScript call. The trace tree 78 is embedded near the end of the HTML/web page document 10 (e.g., as a JavaScript data structure) together with the inspector code 79 (e.g., a script written in JavaScript, ActiveX, or VBScript) for providing associated inspector functions. The types of inspector functions included within the document 10 may be dependent upon the access rights of the particular user. Although the trace tree 78 and inspector code 79 are typically inserted near the end of the document 10, they may be embedded in any appropriate location(s) within the document.

FIG. 4A illustrates the initial inspector view 75 that is presented in one embodiment when the user selects a component 20 on the displayed web page 10. Selection of the page component 20 with a pointer 22 causes the component to be surrounded with a box, or otherwise highlighted on the page 10, as described above. As illustrated, the initial inspector view 75 in this embodiment displays the trace tree 78 as an expandable hierarchy of nodes, with the particular component invocation/node 80 associated with the selected page component 20 highlighted. Nodes falling under this node 80 in the tree represent calls that resulted directly or indirectly from the component invocation event represented by node 80. The node 82 at the top of the trace tree 78 represents the component invocation that triggered the generation of the web page. The initial inspector view 75 in the illustrated embodiment is generated based solely on information and code embedded within the web page 10. As illustrated by this example, many different executable modules or components 44 may be invoked, with a high degree of nesting, to generate a single instance of a single web page.

As the pointer 22 is moved about the web page 10, the information displayed by the inspector 15 may be updated to reflect the currently selected page component 20. For example, in the illustrated embodiment of FIG. 4A, selection of a different page component 20 on the page 10 causes the corresponding node or nodes to be highlighted in the trace tree 78. In addition, selection of a particular node within the trace tree 78 causes the corresponding page component 20 to be highlighted. Thus, the user can efficiently identify the correspondence between specific page components 20 and specific executable component invocation events via an "active pages" type interface. One example of a JavaScript code sequence for providing this type of functionality is included below as an appendix. In one embodiment, when the user hovers the pointer 22 over a page component 20 on the web page 10, the inspector coding additionally causes the name and path of the associated executable component 44 to be displayed adjacent to the mouse cursor 22 (not shown). In one mode of operation, the names and paths of the executable components 44 are additionally displayed within the visible content of the web page 10.

In some cases, clicking on a particular area of the web page 10 may not uniquely identify a single page component 20. For example, the clicked-on page component may include a hidden page component, or may include a child page component having borders that are identical to the borders of the clicked-on page component. To handle these situations, the inspector 15 may optionally implement an appropriate rule for disambiguating the user's selection; for instance, the inspector may always select the lowest-level page component that corresponds to the user's selection. Additionally or alternatively, the inspector 15 may display a menu from which the user can select from a list of the page components 20 (including any hidden components) corresponding to the user's selection. Further, as discussed below, the inspector 15 may provide a menu option for the user to navigate from the currently selected page component 20 to an immediate parent or child of that page component (see FIG. 4C, discussed below). In the embodiment of FIG. 4A, the user may alternatively use the trace tree 78 to cause the desired page component 20 to be selected on the web page 10.

As further illustrated in FIG. 4A, the inspector view 75 may include a control section 88 with controls for enabling and disabling specific features. In the illustrated example, controls are provided for specifying how selected page components 20 are to be differentiated on the web page 10 from the other page components (e.g., via a box, via shading, etc.), and for enabling the display of a status window.

While viewing the trace tree 78 in the initial inspector view 75 of FIG. 4A, the user can click on a node to drill down to a set of views that are specific to the corresponding executable component 44 and to a specific invocation thereof. These executable-component-specific views may be displayed in a separate pop-up window from the initial inspector view 75. Examples of the types of views that may be provided are shown in FIGS. 4B, 5A-5E, 6 and 7.

Figure 4B:
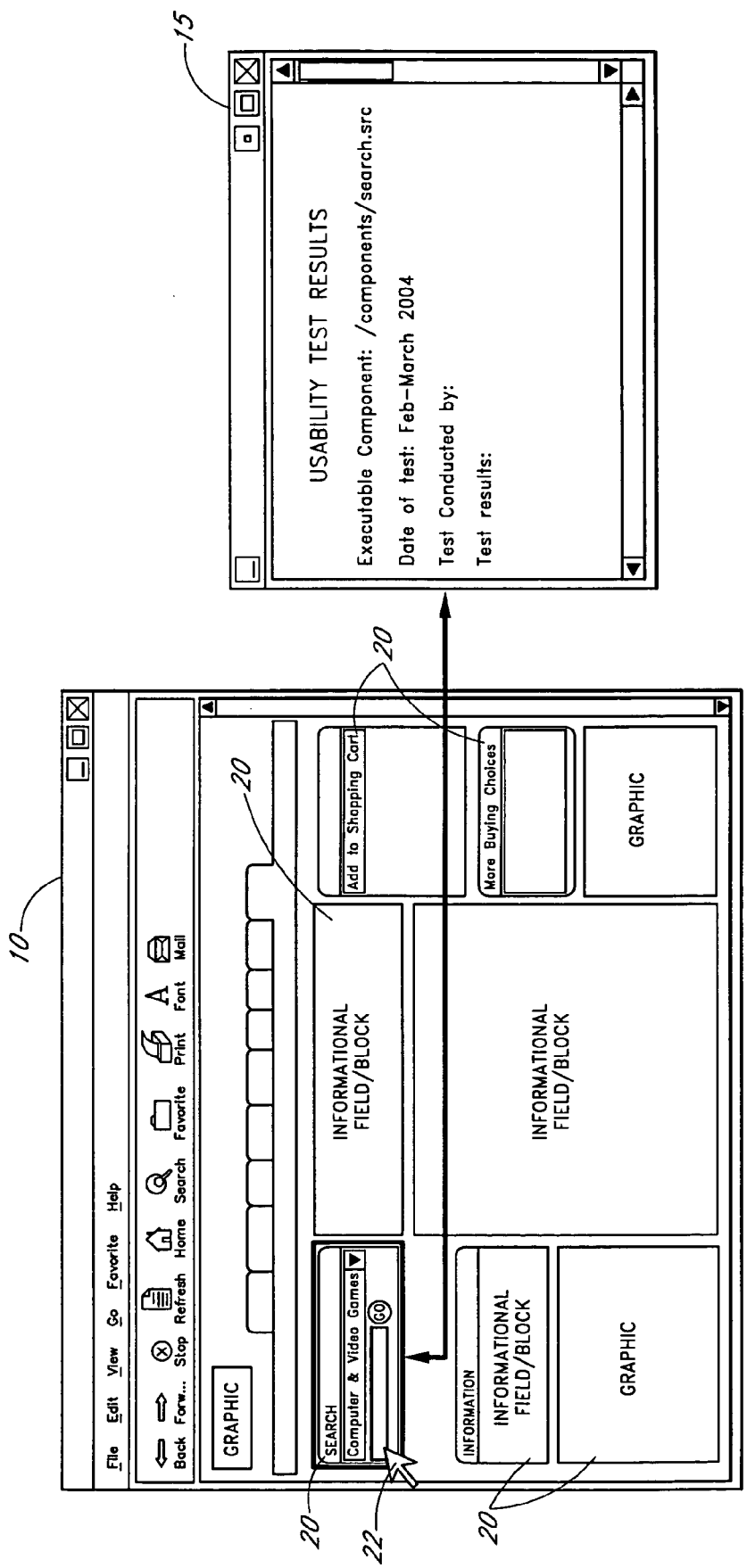
FIG. 4B illustrates an embodiment in which selection of a page component causes the web browser to immediately display information about a corresponding server component that generated the page component.

FIG. 4B illustrates an embodiment in which, when a user selects a page component 20, the inspector 15 immediately displays a particular type of information about a corresponding executable component 44. In this example, the information is in the form of usability test results for the associated executable component, although any type of information may be displayed. Because the inspector 15 does not display a trace tree in this embodiment (and the embodiment of FIG. 4C, discussed below), there is no need to embed a trace tree within the coding of the web page 10.

Figure 4C:
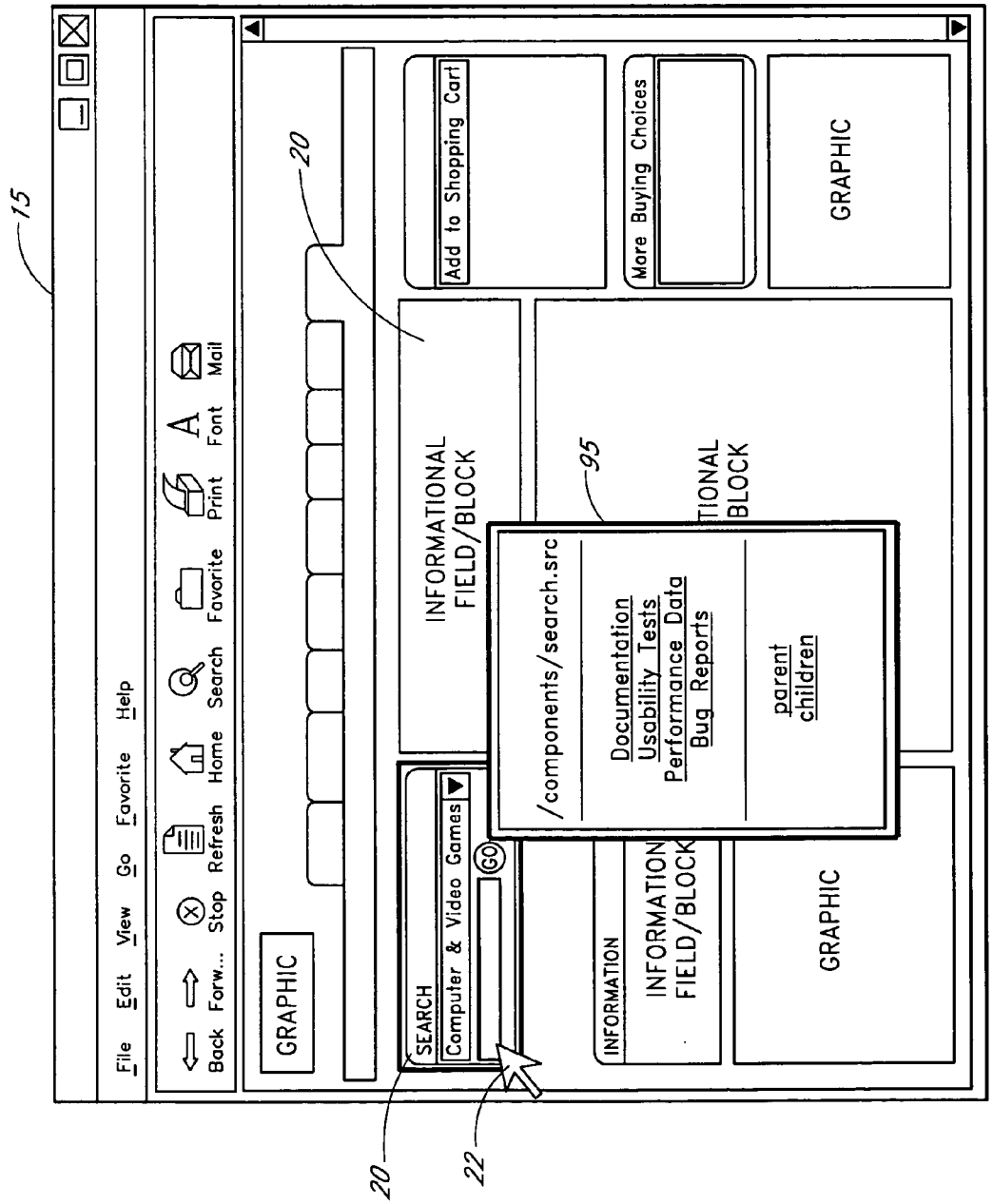
FIG. 4C illustrates an embodiment in which selection of a page component causes the web browser to display a drop-down menu of the types of information that may be accessed about a corresponding server component.

FIG. 4C illustrates an embodiment in which, when a user selects a page component 20, the embedded script (inspector code 79) causes a corresponding drop-down menu 95 to appear, without opening a new window. In this example, the menu 95 displays the name and path of the corresponding executable component 44 (/components/search.src), and includes respective links for accessing four types of information associated with this executable component 44. Selection of one of these links may cause the corresponding information to be displayed in a pop-up inspector window of the type shown in FIGS. 5A-5E, 6 and 7.

With further reference to FIG. 4C, the drop-down menu 95 also includes a "parent" link that, when selected, causes the immediate parent of the selected page component 20 to be selected on the page 10, and which causes the pop-up menu 95 to be updated to reflect this selection. The immediate parent can, in some cases, be the web page 10 itself. The drop-down menu 95 also includes a "children" link that may be selected to navigate to an immediate child of the currently-selected page component 20. As discussed above, in some cases the page components 20 that are selectable using the "parent" and "children" links may be hidden page components that cannot otherwise be selected on the page 10.

FIGS. 5A-5E illustrate one example of a set of inspector views 100 that may be provided for a particular executable component 44. Each such view 100 corresponds to a menu option or tab 102, and provides access to a particular type of information or functionality. In the illustrated example of FIGS. 5A-5E, the tabs 102 include an "arguments" tab, a "service calls" tab, a "documentation" tab, a "source code" tab, and a "log" tab. Different sets of tabs 102 may be provided for different types of executable components 44, and/or for different classes of users (developer, page administrator, outside business partner, etc.). Selection of a tab 102 may cause the web browser 34 to retrieve associated information, or an associated view 100, from the web server 32. In some cases, the information displayed within a particular view 100 may be specific to a particular invocation of the associated executable component 44.

Figure 5A:
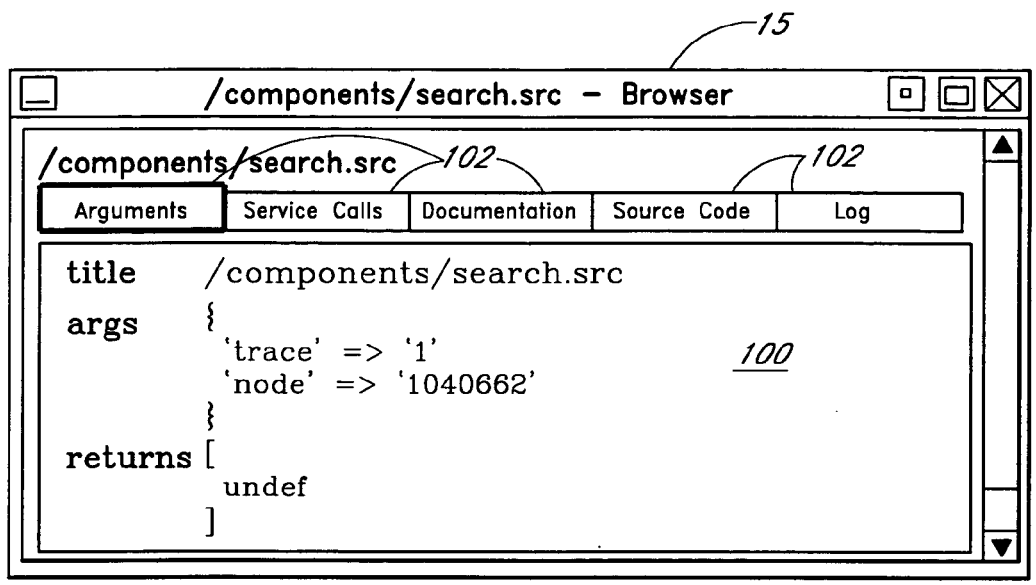
FIGS. 5A-5E illustrate component-specific inspector views that may be displayed by selecting corresponding menu tabs with an inspector window.
Figure 5B:
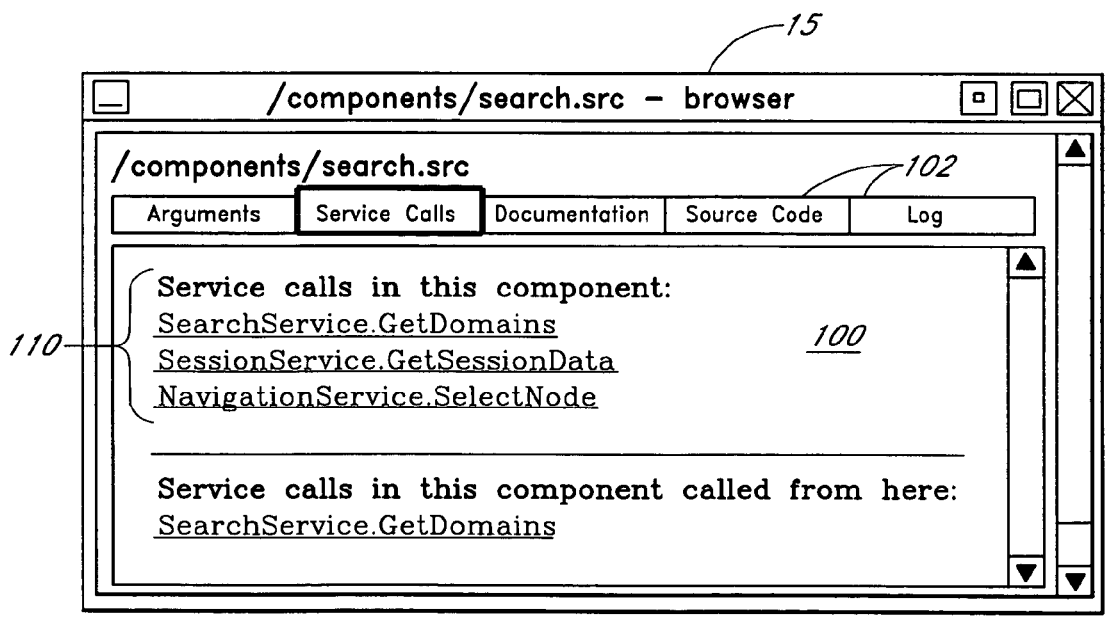
Figure 5C:
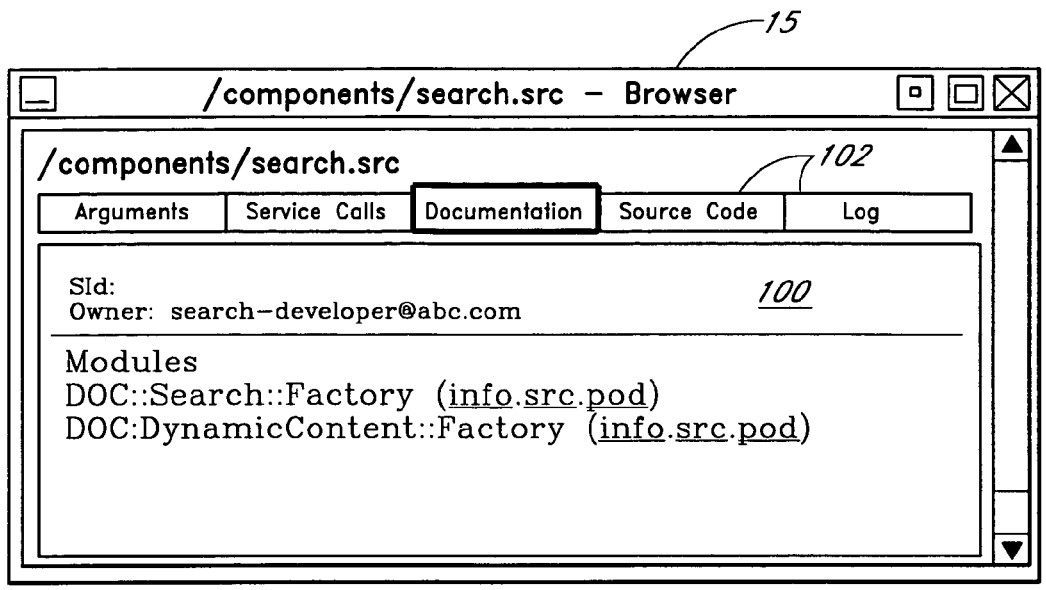

As shown in FIG. 5A, selection of the "arguments" tab 102 causes the following information to be displayed: the name and path of the executable component 44, its arguments, and the value or values it returns. As shown in FIG. 5B, selection of the "service calls" tab 102 causes a list 110 to be displayed of the service calls made by this component 44. Each service call in this list 110 is displayed as a hyperlink that can be selected to bring up the corresponding set of component-level views. As shown in FIG. 5C, selection of the "documentation" tab 102 causes hyperlinks to the associated source code and documentation files for the executable component 44 to be displayed.

Figure 5D:
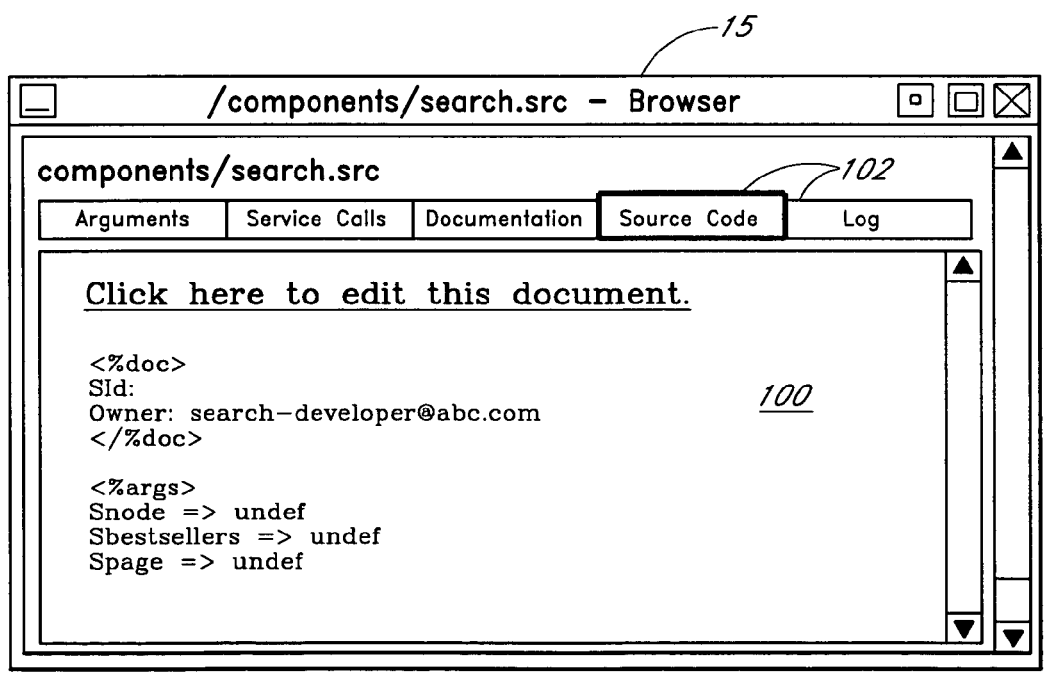
Figure 5E:
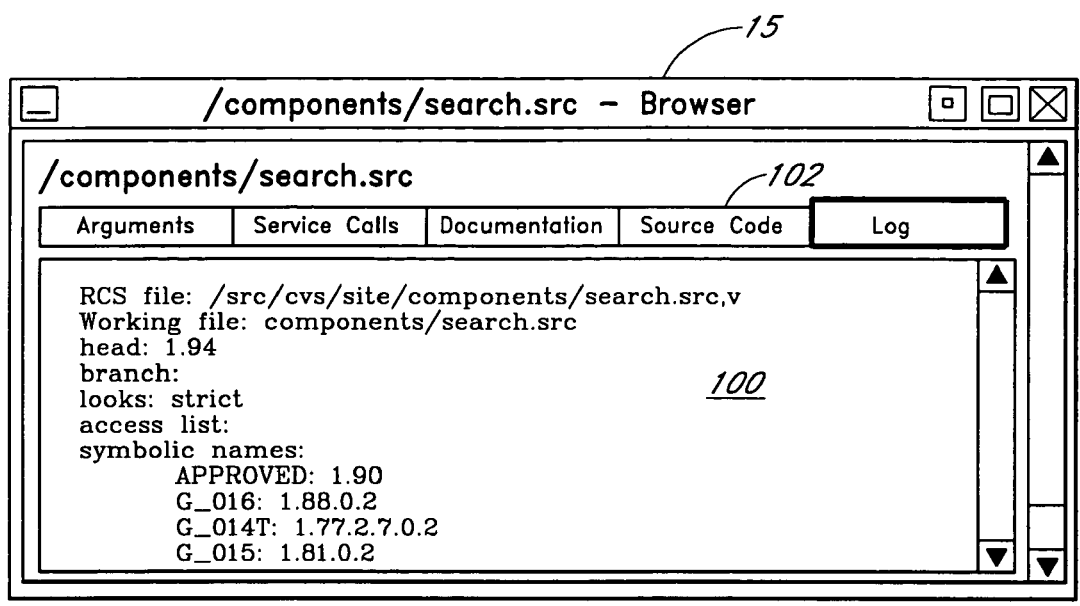

As shown in FIG. 5D, selection of the "source code" tab 102 causes the source code of the executable component to be displayed. A link for editing the source code is also provided in this example. For users that do not have the appropriate access rights for editing the source code, the system may provide read-only access to the source code. As shown in FIG. 5E, selection of the "log" tab 102 causes a log to be displayed of the changes that have been made to the executable component 44, including user, location, time, date, version, status, comments, etc. This information is useful for keeping track of the development status of each component 44, and provides a convenient manner in which to track development activities.

In one embodiment, the CTI system supports the ability for any member of an organization to add a new tab 102 to the menu associated with a particular executable component 44. For example, if a user wishes to publish a specification associated with a particular executable component 44, the user may add an entry or record to the CTI database 56 (FIG. 2) specifying the executable component 44, the tab label, the location of the associated specification document, and if appropriate, access rights data specifying who can access the specification. Thus, new menu options 102 may be added for a particular executable component 44 over time, with different users optionally being responsible for different menu options 102. For instance, a developer might add a "maintenance schedule" menu item for system engineers to obtain maintenance-related documents, and a usability specialist might add a "usability tests" menu item to publish related usability test results to web page designers. JavaBeans, plug-ins, and other types of software technologies that provide for extensibility may be used to implement this feature.

Figure 6:
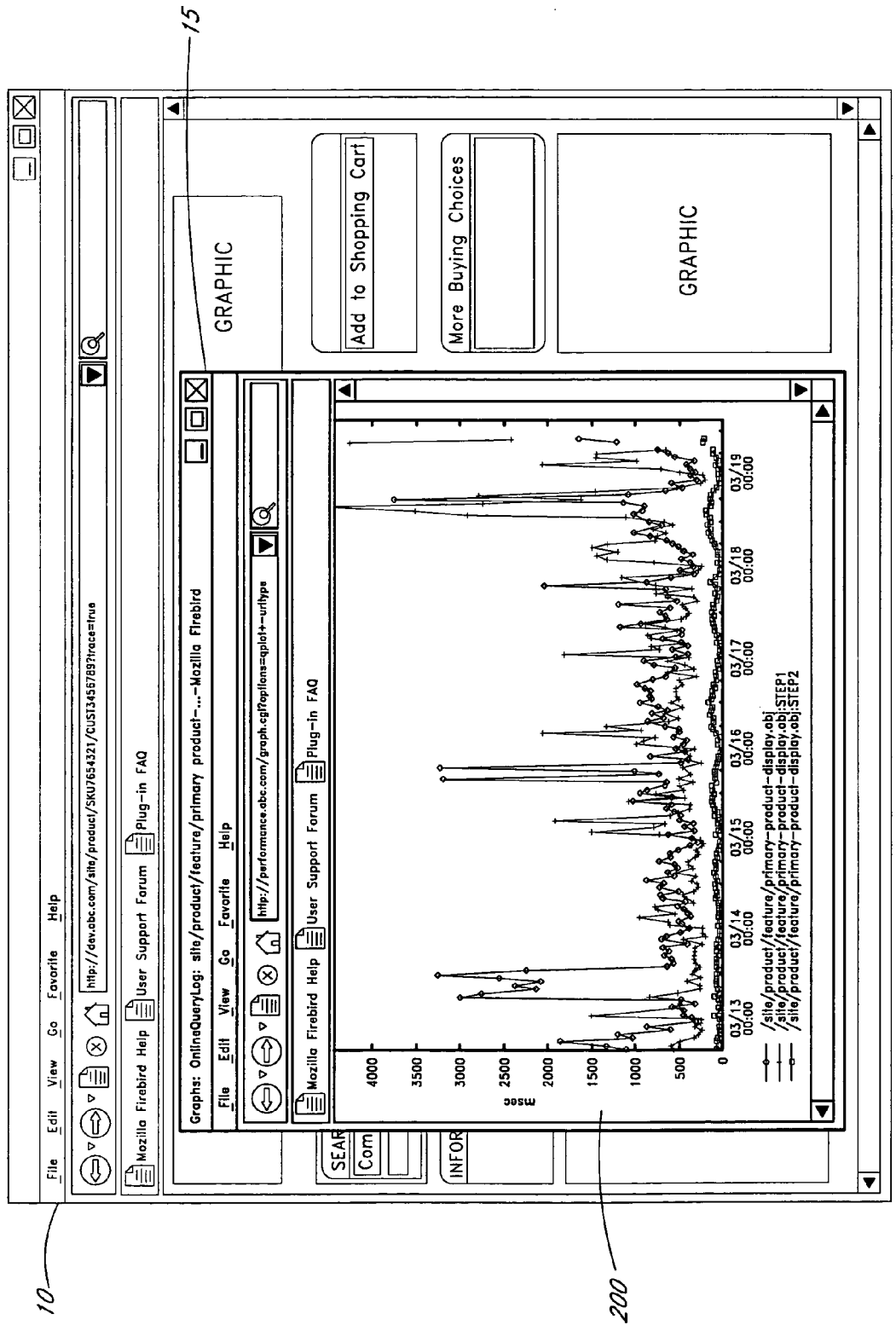
FIG. 6 illustrates an inspector view that displays an example performance chart for an executable component.

Other types of executable-component-specific information may also be made available via other views provided by the inspector 15. For example, as depicted in FIG. 6, a performance view 200 may be provided that displays performance data, such as average execution times, for the particular server component 44. The performance data may be collected by a monitoring program (not shown) that runs on or in conjunction with the web server 32. In addition, invocation-specific information may be made available via other views, such as the time taken to perform that specific invocation.

Figure 7:
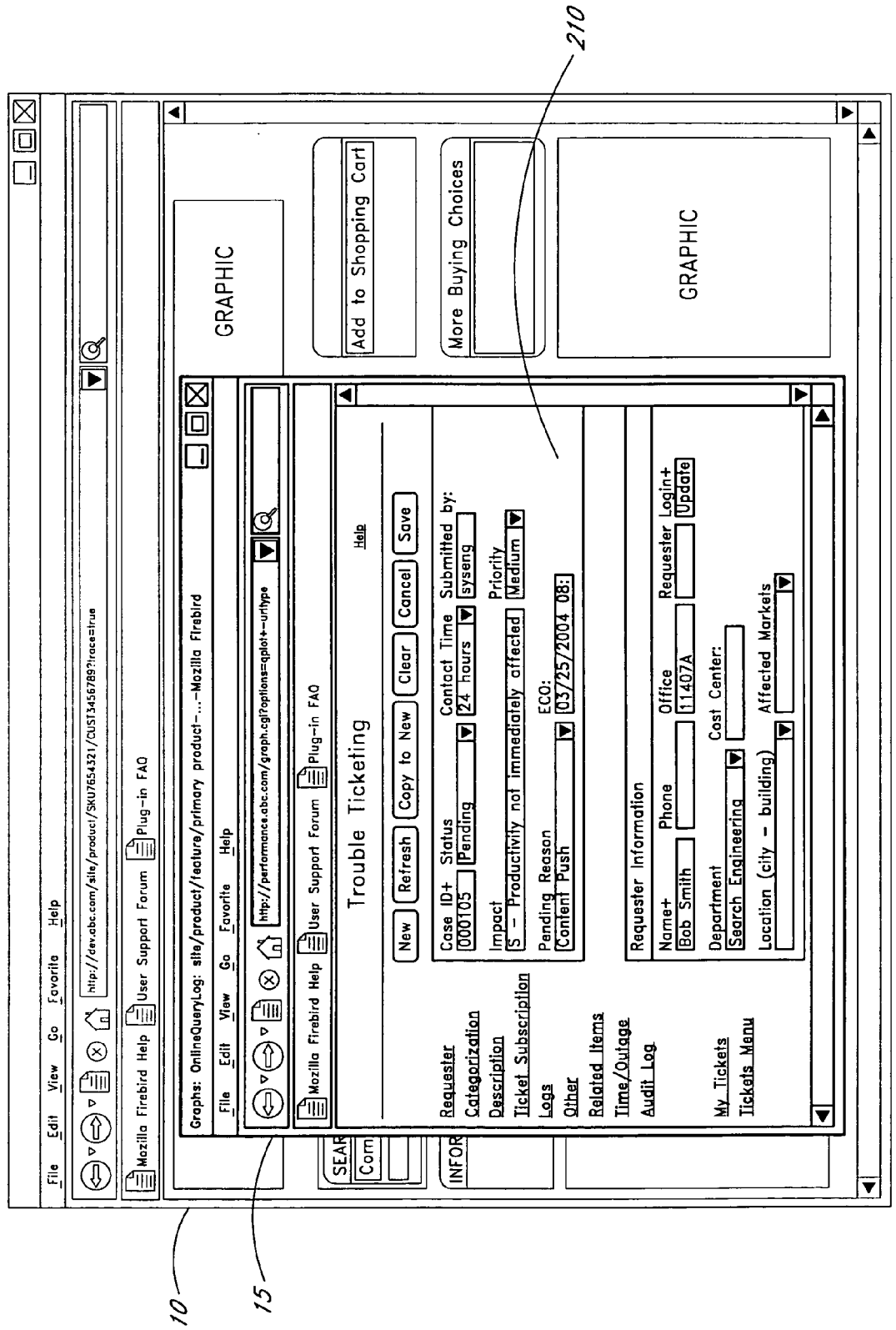
FIG. 7 illustrates a bug reporting view that may be accessed via the inspector in the embodiment of FIG. 2.

In addition, as depicted in FIG. 7, a bug report or "trouble ticket" view 210 may be provided for viewing, editing, and creating trouble tickets for the particular component 44. Thus, for example, upon discovering a problem with a particular page component 20, the user can efficiently identify the corresponding executable component 44, and then create a trouble ticket describing the problem that was encountered. In one embodiment, the trouble ticket view 210 provides an option for the user to attach the trace tree to a newly created trouble ticket, so that information about the particular sequence of events leading to the reported problem is preserved.

It will be appreciated that the aforementioned inspector views and information may differ in various implementations. For example, an entirely different set of inspector tabs 102 and views may be provided in order to achieve a different set of objectives. As one example, where the primary purpose of the CTI system is to monitor application performance, each tab 102 may correspond to a different performance metric or chart that is available for the particular executable component 44. As another example, where the web page 10 hosts advertisements that are selected dynamically, the inspector 15 may provide a view that details why a particular ad was presented for display on the page. Further, although a number of different component-specific views are provided in the illustrated embodiment, the information from some or all of these views can be combined into an integrated view, or can be incorporated into the visual content of the web page 10.

The various inventive features described herein may be used to embed CTI functionality in any type of electronic document that is generated in-whole or in-part dynamically. The invention is particularly useful in development environments, and in other environments in which it is desirable to allow authorized users to obtain information about the executable component or components used to generate a portion of an electronic document.

Mapping Structure

The mapping structure described herein, which may optionally include or be in the form of a trace tree 78, may be implemented in numerous ways. One design decision that an implementer may want to make concerns the assignment of unique identifiers to the objects on each side of the mapping, namely, page components 20 and invocations of server component 44. In one design, well-suited to a Web browsing application, each page component 20 is identified by a path through the page component hierarchy, beginning at the root, i.e., the page 10, and ending with the page component 20 in question. The path may be represented by a list of component names and/or invocation serial numbers. Each server component invocation may be identified by a path through the invocation hierarchy as represented by the trace tree 78.

Another design decision concerns the maintenance of associations between page components 20 and the corresponding invocations of server components 44. In one design, a hash table allows fast lookup of a page component 20 to find a corresponding server component invocation. A second hash table allows fast lookup in the other direction. The hash table may be embedded within the web page 10 using JavaScript or another scripting language. Other well-known data structures could be used for this purpose. Or, as an alternative to maintaining a separate data structure, the system 30 could embed server component invocation identifiers into the HTML tags describing the page 10, and embed page component identifiers into the trace tree 78, if one is used.

Other design approaches avoid spending time generating the full mapping structure when the page 10 is generated. One way to defer generation of the mapping structure is for the script embedded in the Web page 10 to send a request through the network to a server that repeats execution of the hierarchy of calls to server-side components 44, thereby generating the mapping structure that was not generated earlier. The server could either keep the structure in a cache, ready for subsequent requests, or transmit it to the Web browser 34 to avoid the need for further network communications. With such an approach, the time required to fulfill requests subsequent to the first request would be reduced. Another way to defer generation of the mapping structure is to avoid storing a mapping structure at all. Instead, a script embedded in the Web page 10 would send a request through the network to a server that would repeat execution of the hierarchy of calls to server-side components 44, stopping when the desired association is reached, and returning the other member of the pair as the contents of the reply.

Non-Visual Content and Interfaces

The discussion above focuses on use cases in which the user controls the computer 34 via manual input, such as by typing on a keyboard or pointing with a mouse. In practice, other means of user input are sometimes employed, such as speaking into a microphone. The above discussion also focuses on embodiments in which most or all of their perceptible page components 20 are perceived by the user visually, as is typically the case for text, images, and video displayed on a computer monitor. In practice, an electronic document may incorporate non-visual content such as audio recordings. Furthermore, even the visual content of an electronic document may be communicated to the user through audio and/or tactile interfaces. The embodiments described herein can be adapted to non-visual presentation media as well as to non-manual input.

By way of example, consider a system that uses only speech for communication with the user. While a Web browser or specialized "screen reader" software is reading a page to the user, the user may interrupt the reading by saying "Get source code". The Web browser 34 could use the mapping structure to determine which invocation of a server component 44 generated the interrupted audio segment. It could then access the same information that a visually-oriented system would have accessed if the user had, for example, clicked on the "Source Code" tab 102 in FIG. 5E. However, in the speech-oriented system, the Web browser 34 would read the source code to the user instead of displaying it. The inspector code embedded within the electronic document may be appropriately modified to implement this variation.

Although this invention has been described in terms of certain illustrative embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims.

APPENDIX

```
<!--
    This javascript contains reference data from producing the original web page, and code to
connect a popup window with additional information (herein called the "TraceWindow")
with the original web page. These functions receive a message when the user clicks or rolls
the mouse over a piece of the original webpage, which highlights parts of the TraceWindow;
similarly, while rolling the mouse over the TraceWindow, the corresponding part of the
original page is highlighted (either with dark red groove or a yellow background). There are
also functions to produce additional information about a piece of the page (all of the
additional data, or unique references to it, is in the componentDrillDown variable
immediately below).
-->
<script type="text/javascript">
var componentDrillDown = {
1: { title: "autohandler", args:" ", returns: 0 },
2:   { title: "component1.m", args: "session-id = 012345\n asin=B00012456\n", returns:
"true"},
// . . . continued with data for approximately 1000 components. . .
};
</script>
<script type="text/javascript">
var lastLitComponentHTML;
function highlightComponentHTML(compID) {
        lastLitComponentHTML = compID;
        var elem = document.getElementById(compID);
        if (elem) {
            var border = TraceWindow.document.getElementById("highlightTypeBorder");
            var background =
                TraceWindow.document.getElementById("highlightTypeBackground");
            if (border.checked) {
                elem.style.border = "5px groove darkred";
            }
            if (background.checked) {
                elem.style.backgroundColor = "yellow";
            }
        }
        return false;
}
function unhighlightComponentHTML(compID) {
        if (lastLitComponentHTML) {
            var last = document.getElementById(lastLitComponentHTML);
            if (last) {
                last.style.border = "none";
                last.style.backgroundColor = "transparent";
            }
        }
        var elem = document.getElementById(compID);
        if (elem) {
            elem.style.border = "none";
            elem.style.backgroundColor = "transparent";
        }
        return false;
}
function statusHighlighting(evt) {
        evt = (evt) ? evt : event;
        var checkbox = TraceWindow.document.getElementById('hiliteStatus');
        if (checkbox) {
            for (var i in FrameStatus) {
                if (checkbox.checked) {
                    var obj = FrameStatus[i];
                    var outlineItem = TraceWindow.document.getElementById(i);
                    if (outlineItem) {
                        outlineItem.style.backgroundColor = obj.status;
                        moveToComp(i, evt);
                    }
                }
                else {
                    var outlineItem = TraceWindow.document.getElementById(i);
                    if (outlineItem) {
                        outlineItem.style.backgroundColor = "transparent";
                    }
                }
            }
        }
        else {
            alert("Failed to get hiliteStatus element");
        }
}
</script>.
<script type="text/javascript">
```

APPENDIX-continued

```
var lastLitComponentLink;
function lightComponent(compID) {
    if (lastLitComponentLink) {
        lastLitComponentLink.style.color="black";
        lastLitComponentLink.style.fontWeight="normal";
    }
    var elem = TraceWindow.document.getElementById(compID);
    if (elem) {
        elem.style.color="red";
        elem.style.fontWeight="bold";
        lastLitComponentLink = elem;
    }
}
function moveToComp(compID, evt) {
    evt = (evt) ? evt : event;
    expandAll( );
    var comp = TraceWindow.document.getElementById(compID);
    if (comp) {
        var x = comp.offsetLeft − 30;
        var y = comp.offsetTop − 30;
        if (x < 0) { x = 0; }
        if (y < 0) { y = 0; }
        TraceWindow.scrollTo(x, y);
        lightComponent(compID);
        TraceWindow.focus( );
    }
    evt.cancelBubble = true;
    evt.returnValue = false;
}
function drillComponent(compID) {
    lightComponent(compID);
    var obj = componentDrillDown[compID];
    var componentWindow = window.open("/gp/componentDrillDown?comp=" +
escape(obj["title"]) + "&traceID=" +
escape(compID),"ComponentTraceWindow","status,resizable,scrollbars,height=400,width=650,
left=10,top=10,screenX=10,screenY=10");
    componentWindow.focus( );
    return false;
}
function getComponentDrillDownData(compID) {
    var obj = componentDrillDown[compID];
    var content = "<table border=0 padding=10>";
    var alt = 0;
    for(var i in obj) {
        if (alt == 0) {
            content += "<tr><td class='title1'><b>" + i + "</b></td><td class='data1'>" + obj[i] +
"</td></tr>";
            alt = 1;
        }
        else {
            content += "<tr><td class='title2'><b>" + i + "</b></td><td class='data2'>" + obj[i] +
"</td></tr>";
            alt = 0;
        }
    }
    content += "</table>";
    return content;
}
function getSubComponents(compID, tree, found) {
    var sublist = new Array;
    if (! tree) {
        tree = olData;
    }
    if (tree.item) {
        if (found) {
            sublist[sublist.length] = tree.item.uri;
        }
        else if (tree.item.uri == compID) {
            found = 1;
        }
    }
    var children = tree.childNodes;
    if (children) {
        for (var i=0; i < children.length; i++) {
```

APPENDIX-continued

```
            sublist = sublist.concat(getSubComponents(compID, children[i], found));
        }
    }
    return sublist;
}
</script>
```

What is claimed is:

1. A method for facilitating user analysis of executable components invoked to dynamically generate web pages, comprising:

monitoring the dynamic generation of a web page by a server system to identify executable components invoked on the server system in generating the web page;

generating a mapping structure that associates page components of the web page with the corresponding executable components used to generate such page components; and incorporating into coding of the web page a representation of said mapping structure, together with code that is executable by a web browser to provide a visual indication of the associations between the page components and the executable components as represented within the mapping structure.

2. The method of claim 1, wherein the method is performed in response to a programmatic determination that a user requesting the web page has access rights that permit visualization of the associations between the page components and the executable components.

3. The method of claim 1, wherein at least some of page components are visual components of the web page.

4. The method of claim 1, wherein the code incorporated into the web page causes the web browser to respond to user selection of a page component while viewing the web page by displaying an indication of a corresponding executable component used to generate the page component.

5. The method of claim 1, wherein the mapping structure identifies a hierarchy of calls made to specific executable components during generation of the web page.

6. The method of claim 5, wherein the code incorporated into the web page causes the web browser to display a tree structure that represents the hierarchy of calls.

7. The method of claim 6, wherein the code incorporated into the web page is configured to cause the web browser to respond to user selection of a page component on the web page by highlighting a corresponding node of the tree structure.

8. The method of claim 6, wherein the code incorporated into the web page is configured to cause the web browser to respond to user selection of a node within the tree structure by visually distinguishing a corresponding page component within the web page.

9. The method of claim 6, wherein the code incorporated into the web page is configured to cause the web browser to respond to user selection of a node within the tree structure by displaying a menu of options available for a corresponding executable component, said menu providing access to one or more development files associated with the executable component.

10. The method of claim 1, wherein the code incorporated into the web page provides functionality for a user to access remotely-stored development information about at least some of the executable components.

11. The method of claim 1, further comprising transmitting to the web browser, in association with the web page, a view that provides functionality for a user to post a bug report for an executable component used to generate the web page.

12. The method of claim 1, further comprising transmitting to the web browser, in association with the web page, a view that provides functionality for a user to edit source code of an executable component used to generate the web page.

13. A computer-readable medium having stored therein a web page generated according to the method of claim 1.

14. A web server system that generates web pages according to the method of claim 1.

15. A system for facilitating the analysis of a dynamic web page generation process, the system comprising:

a utility that identifies executable modules invoked on a server system during dynamic generation of a web page, and generates a mapping structure that associates the executable modules with corresponding components of the web page; and a web page generator that incorporates, into coding of the web page, inspector code that is executable by a web browser to visually indicate the associations between executable modules and the components of the web page as reflected within the mapping structure.

16. The system of claim 15, wherein the web page generator additionally incorporates the mapping structure into the coding of the web page such that the web browser can display the associations based solely on information contained within the web page.

17. The system of claim 15, wherein the inspector code causes the web browser to retrieve at least a portion of the mapping structure from the server system in response to a user action.

18. The system of claim 15, wherein the utility identifies a hierarchy of calls made to executable modules during dynamic generation of the web page, and the inspector code causes the web browser to display a visual representation of the hierarchy of calls.

19. The system of claim 18, wherein the inspector code is responsive to user selection of a node within the visual representation of the hierarchy of calls by causing the web browser to visually distinguish a corresponding component of the web page.

20. The system of claim 15, wherein the inspector code is responsive to user selection of a component of the web page by causing the web browser to display an indication of a corresponding executable module.

21. The system of claim 15, wherein the utility additionally generates a trace tree that represents a hierarchy of executable module invocations that occur during generation of the web page, and the web page generator incorporates a representation of the trace tree into the coding of the web page.

22. The system of claim 21, wherein the inspector code is responsive to user selection of a component of the web page by causing the web browser to display, within a visual representation of the trace tree, a corresponding invocation of an executable module.

23. The system of claim 15, further comprising a server application that interoperates with the inspector code to provide restricted user access to development files associated with the executable components.

24. The system of claim 15, wherein the web page generator incorporates the inspector code into the web page only if a user requesting the web page is determined to have access rights that permit visualization of the associations.

25. The system of claim 15, in combination with a server that executes the utility and the web page generator.

26. A computer-readable medium having stored therein an electronic document, the electronic document comprising:

a plurality of document components that are perceptible to a user when the document is presented by a document presentation program, each document component being associated with a module executed by a server system to generate that document component, such that at least some of the document components are associated with different modules than other document components; and code that is executable by the document presentation program to interactively identify the associations between the document components and the modules, such that a user may select a document component to identify a corresponding module executed by the server system to generate the document component.

27. The computer-readable medium as in claim 26, wherein the electronic document further comprises a mapping structure that associates the document components with the corresponding modules executed by the server system to generate the document components, wherein the code that is executable by the document presentation program accesses the mapping structure to look up and inform the user of the associations.

28. The computer-readable medium as in claim 26, wherein the code that is executable by the document presentation program identifies the associations by accessing the server system in response to actions by the user, such that the associations need not be recorded within electronic document.

29. The computer-readable medium as in claim 26, wherein the code causes the document presentation program to display a trace tree identifying a hierarchy of calls that were made to the modules during generation of the electronic document by the server system.

30. The computer-readable medium as in claim 29, wherein the code is responsive to user selection of a document component of the electronic document by highlighting a corresponding node of the trace tree.

31. The computer-readable medium as in claim 29, wherein the code is responsive to user selection of a node of the trace tree by highlighting a corresponding document component within the electronic document.

32. The computer-readable medium as in claim 26, wherein the electronic document is a web page.

33. The computer-readable medium as in claim 26, wherein the electronic document is a structured language document.

34. The computer-readable medium as in claim 26, wherein at least some of the document components are audio components that are output audibly by the document presentation program.

* * * * *